United States Patent Office.

JAMES TRAINER, OF VINTON STATION, OHIO.

Letters Patent No. 78,029, dated May 19, 1868.

IMPROVED ANIMAL-TRAP.

*The Schedule referred to in these Letters Patent and making part of the same.*

TO ALL WHOM IT MAY CONCERN:

Be it known that I, JAMES TRAINER, of Vinton Station, in the county of Vinton, and State of Ohio, have invented a new and improved Animal-Trap; and I do hereby declare that the following is a full and exact description of the same, reference being had to the accompanying drawings, and to the letters of reference marked thereon.

Figure 1 is a front elevation of my improved trap, showing the levers and attachments.

Figure 2 is a view of the end of the trap, showing the drop-gate and entrance.

Figure 3 is a vertical cross-section through line $x\ x$ of the body of the trap, showing the oscillating-lever, catch, tilting-platform, and roller on the lever, and various connections of the same; and Figure 4 is a vertical section through the front and rear compartments, showing the vibrating-platform and connecting-rod, with its attachments.

This invention consists in the peculiar arrangement of the compartments of an animal-trap, and such construction of levers, tilting-platform, and catches combined therewith, that the entrance of the animal is readily and certainly attracted, and by one and the same operation of the devices the animal is securely imprisoned in a separate compartment, and the trap reset for another.

In order that those skilled in the art to which my invention pertains may make and use the same, I will proceed to describe more specifically its construction and operation, premising that the same letters refer to identical parts in all the figures of the drawing.

The general arrangement of compartments is as follows:

A is the main compartment of the trap. It is provided on the front with open bars, admitting the light. The ends are covered by falling doors, $b\ b'$, one of which is shown in front in fig. 2. These doors slide freely in guides, and are suitably suspended from the end of the levers $c\ c'$.

In the rear of this compartment, at right angles with it, is another compartment, B, shown in section in fig. 4. The upper part of this compartment is barred to admit light, and at the same time prevent the escape of the animal, and in the lower part is a narrow barred passage, B', which forms the only means of admission for the animal from the main or front part of the trap to the rear. This passage is closed in the rear end by the oscillating-platform $d$, which in its normal position is thrown up and closes the rear entrance.

On the top of the main part of the trap are the levers $e\ e'$, which support the vertically-sliding gates, as before specified, and which are pivoted on vertical posts E E'. These levers, at their contiguous ends, are peculiarly constructed with hand-shaped extremities, suited to hold the trigger $f$ in fig. 3, which is allowed free motion, but is guarded from displacement by fingers of wire fixed to the levers.

The dog $f$ is pivoted between the standards $g\ g'$, at their upper end, and is provided at its lower extremity with a notch, which, when the dog is thrown outward at its lower end by the depression of the levers, catches in a similar notch in vibrating-arm $h$. This arm is also pivoted between the posts $g\ g'$, and has affixed to its lower end a hook for holding the bait.

These catches are so adjusted, that when in gear the contiguous ends of the levers must be depressed, and held in that position, thus throwing up the outer end and holding the entrance open.

On the bottom of the trap, in the main part, near the barred window, and just behind the vibrating-arm $h$, is a tilting-platform, $m$, extending nearly across the passage, and arranged so as to come under the bait. The platform is pivoted eccentrically and near the front, and has a vertically-bent loop, which touches the vibrating-arm $h$, when that arm has its notch in gear with the dog $f$, this occurring, as stated, only when the levers are depressed and the doors raised.

In the rear compartments, and located in B', is the elongated platform $d$, which is pivoted at $i$. This narrow passage, B', is constructed to admit the light above, and when the platform is depressed affords free egress into the compartment B. From the platform $d$ is a rod, preferably of wire, extending to an arm, K, which moves freely up and down the side of the box, and is fixed to this arm. This arm, at its upper end, J. Trainer,
Cage Trap,
N° 78,029.  Patented May 19, 1868
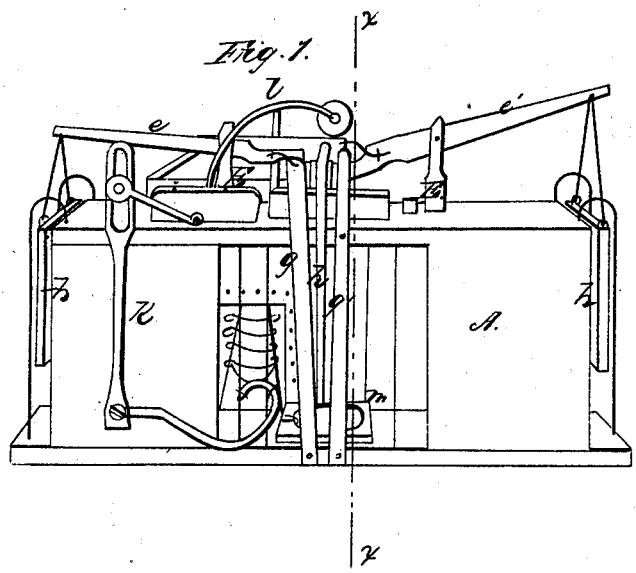
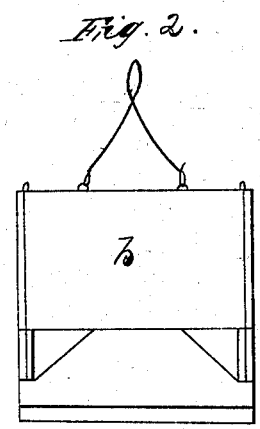
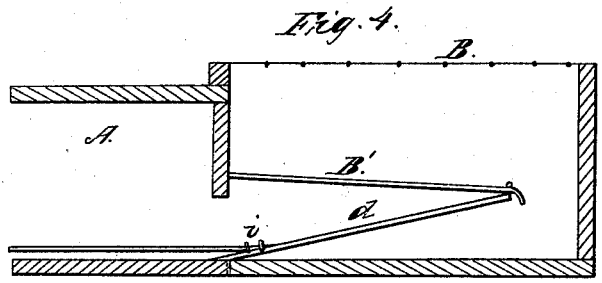
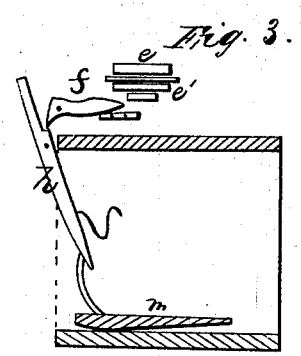
Witnesses
E. R. Beadle
Frederic Thomas
Inventor
Jas. Trainer by
H. W. Beadle atty